United States Patent [19]

Smith et al.

[11] Patent Number: 5,347,435
[45] Date of Patent: Sep. 13, 1994

[54] LINEAR LAMP HOLOGRAPHIC TRAPPED BEAM CENTER HIGH MOUNTED STOPLIGHT

[75] Inventors: Ronald T. Smith, Torrance; Andrew Daiber, Stanford, both of Calif.

[73] Assignee: Hughes Aircraft Company, Los Angeles, Calif.

[21] Appl. No.: 994,816

[22] Filed: Dec. 22, 1992

[51] Int. Cl.⁵ ............................................ B60Q 1/26
[52] U.S. Cl. .................................. 362/80.1; 362/83.3; 362/61; 362/253; 362/812; 340/479; 359/1; 359/15
[58] Field of Search ............. 362/83.3, 80.1, 61, 362/253, 812; 340/479; 359/1, 15

[56] References Cited

U.S. PATENT DOCUMENTS

| | | | |
|---|---|---|---|
| 2,015,324 | 9/1935 | Smith | 362/265 |
| 3,237,003 | 2/1966 | Tomkinson | 362/265 |
| 3,848,974 | 11/1974 | Hosking et al. | 359/858 |
| 3,885,095 | 5/1975 | Wolfson et al. | 359/630 X |
| 4,643,515 | 2/1987 | Upatnieks | 359/10 |
| 4,790,613 | 12/1988 | Moss | 359/15 X |
| 4,892,369 | 1/1990 | Moss | 350/3.7 |
| 4,916,593 | 4/1990 | Moss et al. | 362/80.1 |
| 4,966,426 | 10/1990 | Moss et al. | 362/80.1 X |
| 5,101,193 | 3/1992 | Smith et al. | 362/80.1 X |
| 5,186,533 | 2/1993 | Hori | 362/80.1 |

*Primary Examiner*—Larry Jones
*Attorney, Agent, or Firm*—L. A. Alkov; W. K. Denson-Law

[57] ABSTRACT

A holographic center high mounted stop light (CHMSL) employing a linear lamp source comprising a long and narrow cylindrical gas discharge bulb, a non-imaging light concentrator cavity, a plastic light guide and a hologram. The CHMSL is characterized by previously unattainable compactness, weight savings, rear occupant headroom, driver rearward visibility, and electrical efficiency.

12 Claims, 10 Drawing Sheets

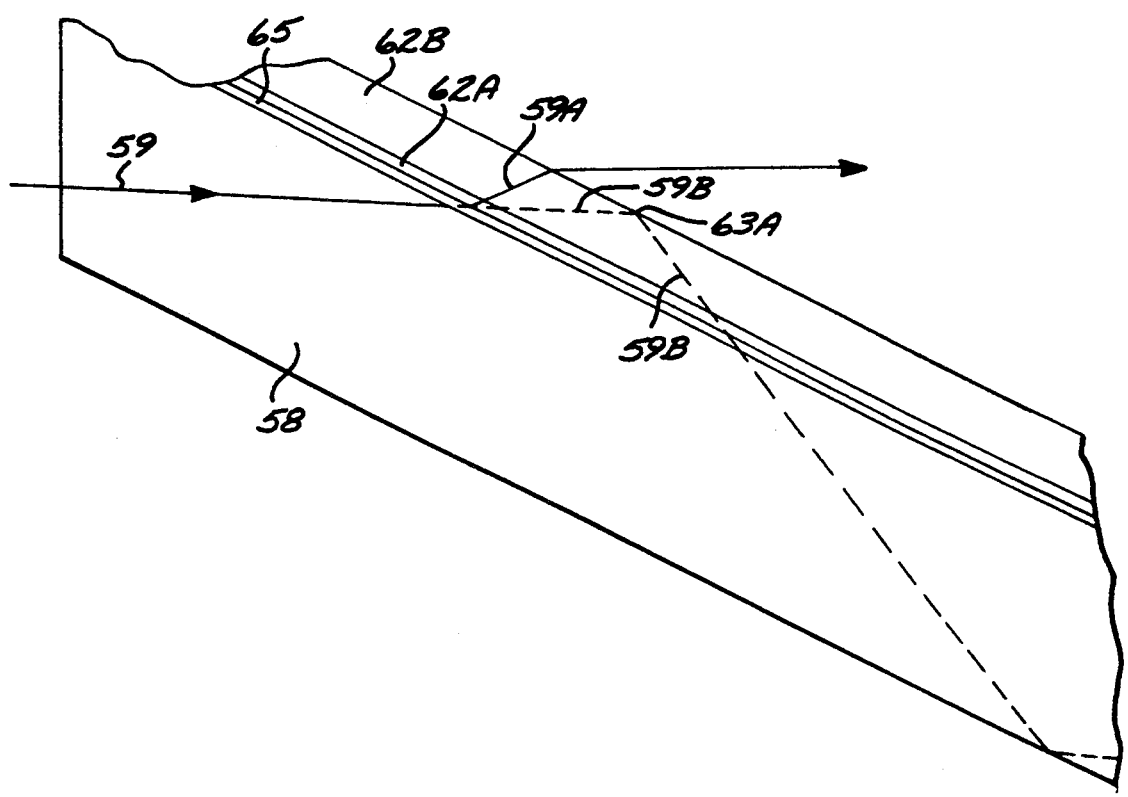
FIG. 1B
FIG. 1C
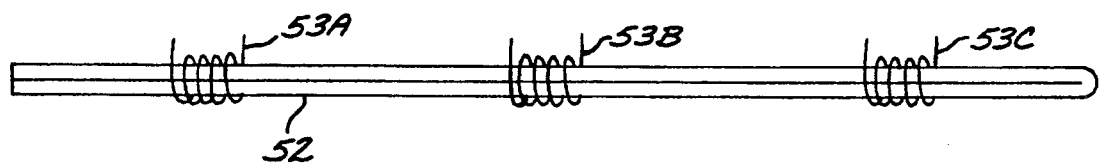

WAVELENGTH IN NANOMETERS
MIN. DIVISION = 18.00 NANOMETERS

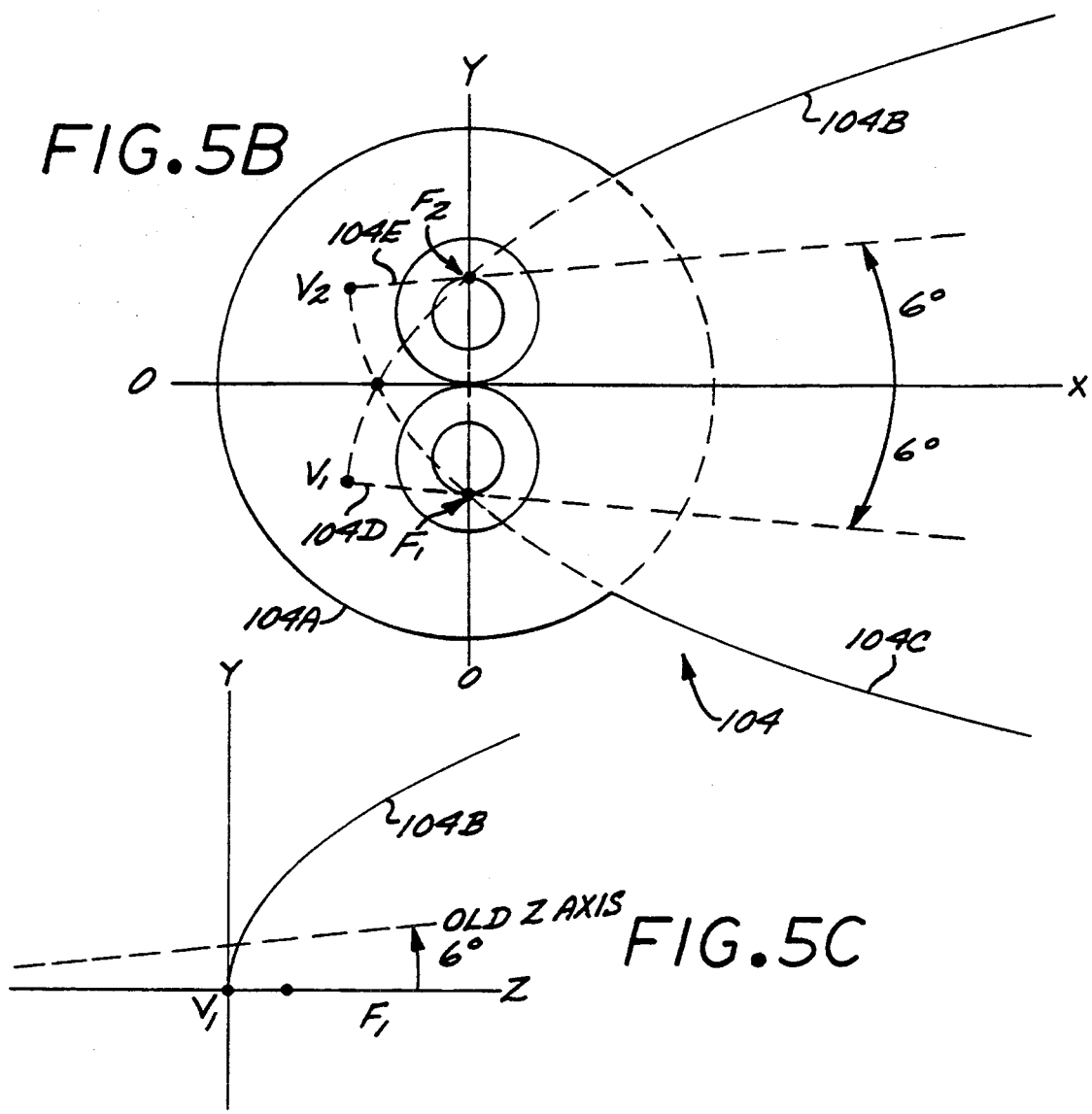
FIG.5B
FIG.5C
FIG.6
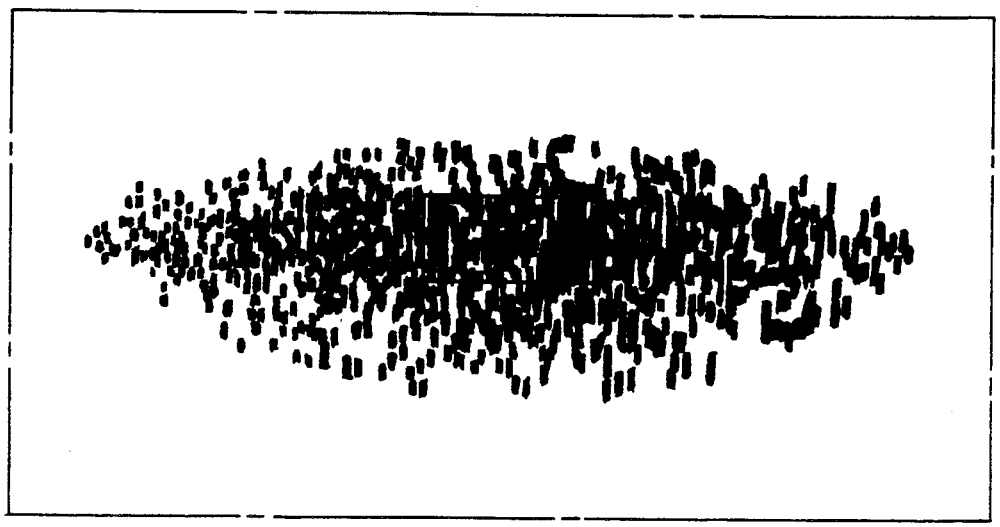

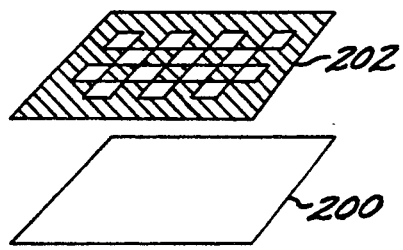 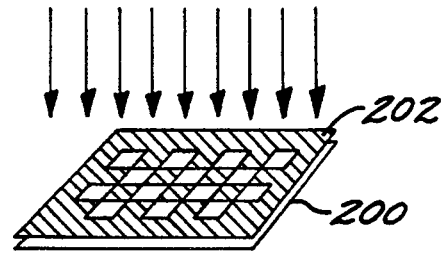
FIG.8A        FIG.8B
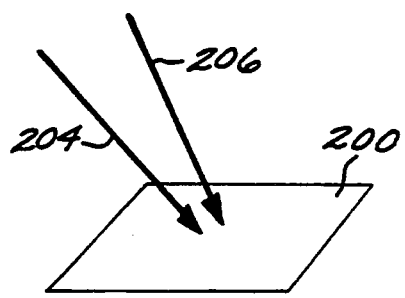 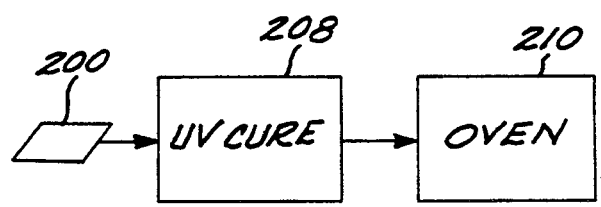
FIG.8C        FIG.8D
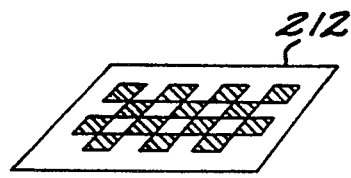
FIG.8E

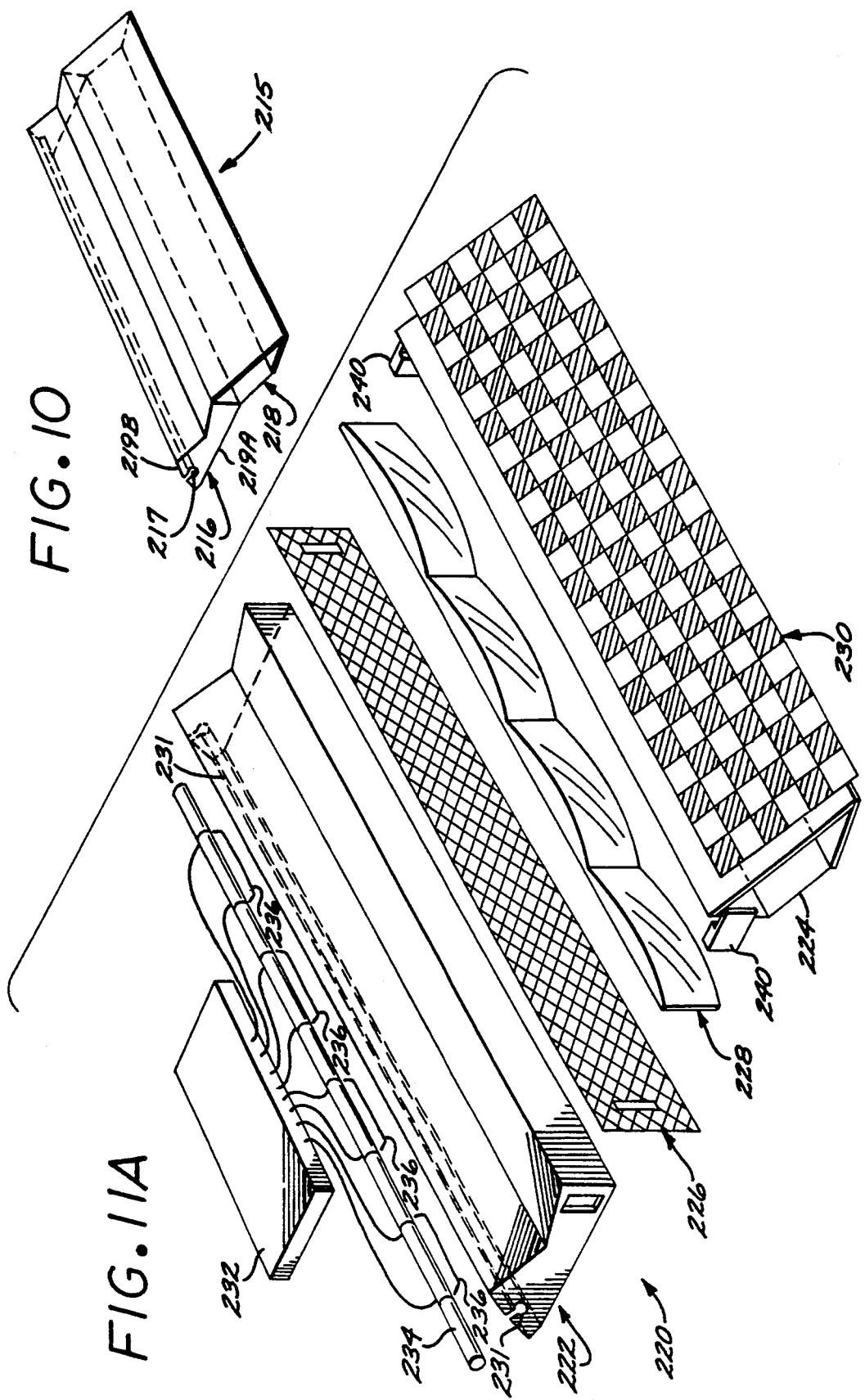

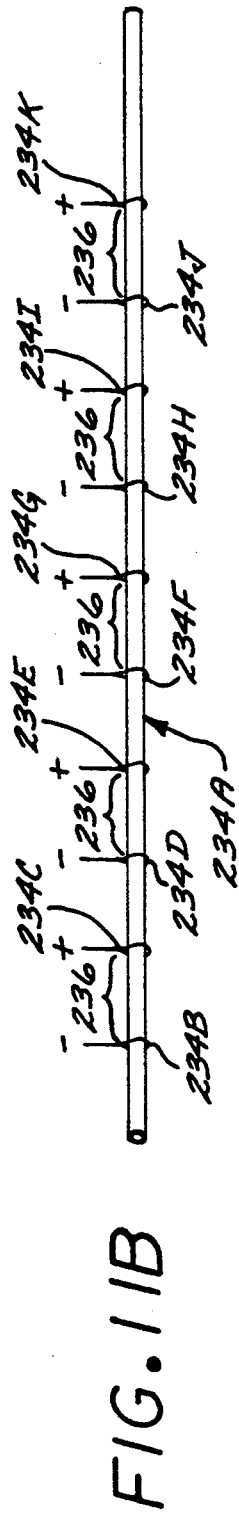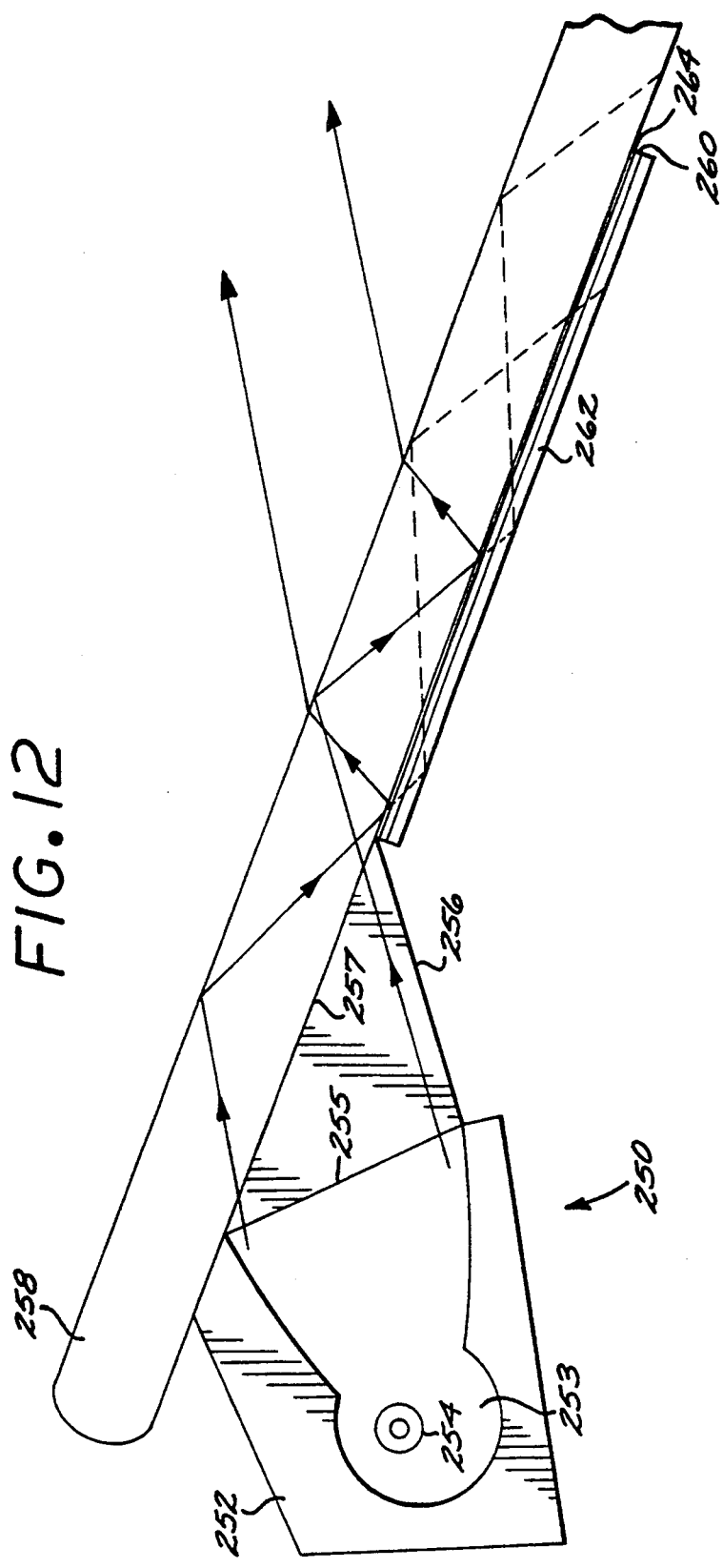

LINEAR LAMP HOLOGRAPHIC TRAPPED BEAM CENTER HIGH MOUNTED STOPLIGHT

BACKGROUND OF THE INVENTION

The present invention relates to center high mounted stoplights (CHMSL) for vehicles.

Since 1985 every U.S. automobile has been required to include a CHMSL as a safety feature. Typically the CHMSL is mounted behind the rear window, either in the roof or on top of the rear deck. In either case, the unfortunate result is partial obstruction of the driver's view through the rear window. U.S. Pat. No. 4,892,369 describes a holographic CHMSL which addresses this problem, and includes a transparent hologram on or near the rear window and a remotely located lamp which delivers light to the hologram. Two specific types of holographic CHMSLs are the floodlit CHMSL described in U.S. Pat. No. 4,916,593, and the trapped beam CHMSL described in pending application Ser. No. 87503, both assigned to the assignee of this application. In the floodlit CHMSL the remotely located lamp projects a beam of light through air to a hologram mounted on the rear window. In the trapped beam CHMSL, lamp light from an incandescent halogen bulb is injected into a thin light guide which carries the light and delivers it to a hologram. This design allows for greater headroom for the rear occupant as well as improved rearward visibility for the driver.

While holographic CHMSLs employing halogen bulbs as the light source are advantageous over a conventional CHMSL in terms of reduced size and greater driver rearward visibility, such CHMSLS require considerable electrical power, their size and weight are not as small as that which is ultimately desired, they dissipate more heat from the bulbs than desired, and the complexity of these devices results in additional cost and manufacturing difficulties.

It would therefore be advantageous to provide a holographic CHMSL which possesses the advantages of the trapped beam CHMSL but which overcomes the aforementioned shortcomings.

SUMMARY OF THE INVENTION

In accordance with the invention, a holographic stoplight is provided for a vehicle having a rear window, wherein a hologram is mounted on or near the rear window for diffracting playback illumination to produce a holographic stoplight image visible from behind the vehicle. The stoplight includes a light source for providing the hologram playback illumination, the source comprising a gas-filled lamp tube excited by RF or DC electrical energy. The stoplight further includes a non-imaging optical concentrator for collecting and collimating light generated by the light source to within a predetermined angular range and light guiding means for guiding the collected and collimated light from the concentrator to the hologram.

In a preferred embodiment, the lamp tube is filled with gas comprising neon with a small amount of argon. The lamp tube is characterized by an elongated configuration, the optical concentrator comprises a concentrator cavity defined by a reflecting concentrator surface, and the lamp tube is disposed within the concentrator cavity.

The gas discharge tube can be excited by application of an RF excitation signal to coils wrapped about the periphery of the lamp tube.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 1A–1C illustrate a holographic CHMSL embodying the invention.

FIGS. 5A–5C illustrate a non-imaging concentrator useful for a CHMSL embodying the invention.

FIG. 6 is a map of the rays reaching the hologram from the concentrator of FIG. 5.

FIGS. 8A–8E illustrate a method of fabricating a patterned hologram.

FIG. 10 illustrates a further embodiment of CHMSLs embodying the present invention with first and second light guides, FIGS. 11A–11B illustrate another embodiment of CHMSLs embodying the present invention with first and second light guides each respectively formed of solid pieces of acrylic, FIG. 12 illustrates yet another embodiment of CHMSLs embodying the present invention which includes a hologram structure secured to the rear window of a vehicle.

DETAILED DESCRIPTION OF THE PREFERRED EMBODIMENT

Figure 1A:
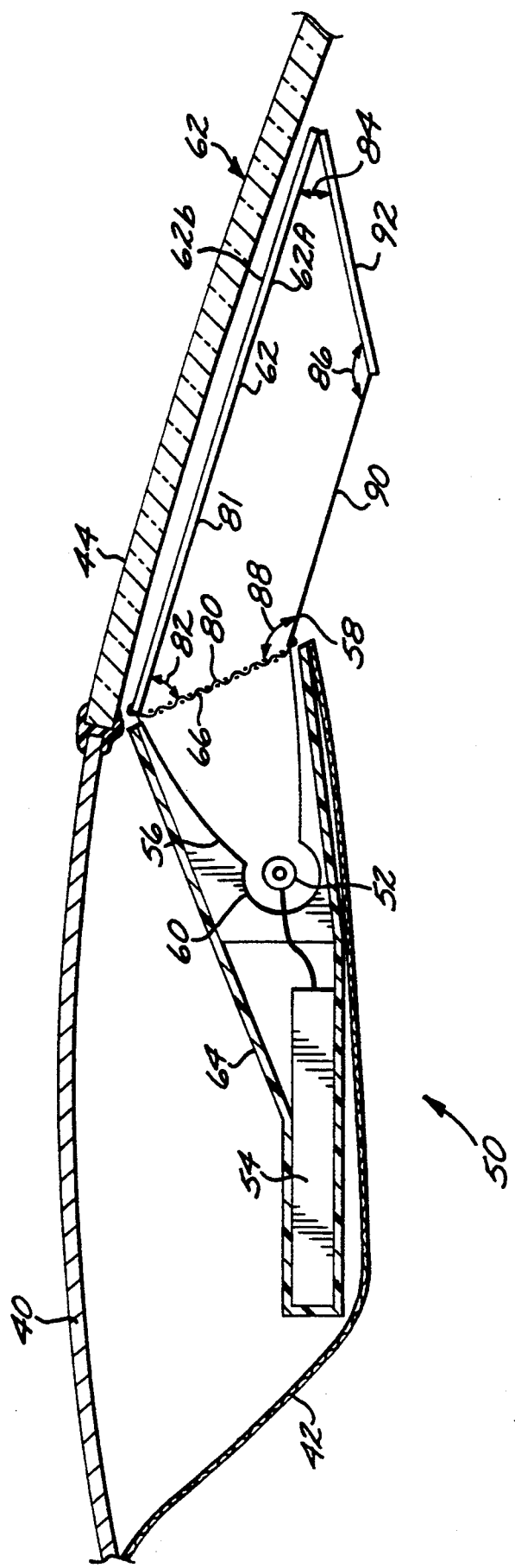

A linear light holographic CHMSL 50 embodying the invention is shown in FIG. 1A. In this embodiment, the CHMSL 50 is installed in a vehicle comprising a roof 40, an interior headliner 42 and a rear window 44. The device 50 comprises a gas discharge light source 52 driven by a power supply 54, a non-imaging light concentrator cavity 56, plastic light guide 58, and a hologram 62 attached to the light guide 58 by optical adhesive (not shown in FIG. 1A) and adjacent to but spaced from the rear window 44, to couple light out into the rear ambient field. Although many different arrangements of a gas discharge light source, concentrator and hologram are possible, FIG. 1A shows the presently preferred embodiment.

The concentrator 56 is fabricated of a high-temperature plastic or metal. The light source and concentrator elements are disposed in a cast metal housing 64. The plastic of the concentrator 56 is plated with an optically reflective coating. A wire mesh screen 66 is disposed about the end of the concentrator 56 to prevent the majority of RF energy from escaping while allowing visible radiation to pass through. Attached to the end of the concentrator 56 is the plastic light guide 58, which reflects any light from the concentrator 56 not directly impinging on the hologram 62 back onto the hologram. The light guide 58 is secured to the concentrator 56 by thermally conductive epoxy. The light guide 58 is fabricated in this embodiment from a solid block of clear plastic such as polycarbonate.

The light guide 58 is characterized by a side 80 which is employed as the input aperture for the light guide, with the light from the collector 56 directed through the input aperture. The hologram 62 is applied against the long side 81 of the light guide. The hologram 62 comprises a photo-polymer film 62A which is secured to a carrier film 62B, such as a Mylar layer. The lengths of the respective sides of the light guide 58 are selected so that the angles 82, 84, 86, 88 at which the sides meet will provide total internal reflection of light incident on the sides 90 and 92 when reflected from the hologram 62. In this exemplary embodiment, angle 82 is 42°, angle 84 is 30°, angle 86 is 120°, and angle 88 is 138°. The only mechanism for escape of light from the light guide is via diffraction by the hologram 44.

The CHMSL 50 is secured adjacent the roof of the vehicle so that the hologram 62 is preferably positioned adjacent to but spaced from the inside surface of the rear window 44 of the vehicle by greater than ⅛ inch. The hologram is spaced from the rear window to accommodate vehicle build tolerances. Since the CHMSL is attached to the vehicle roof, and there is an uncertainty in position of the rear window relative to the roof due to the build tolerance, and there must be a reasonable space between the hologram and rear window to avoid interference. The hologram and light guide could be attached to the rear window if one allows the rest of the CHMSL to not be attached to the roof; however, in that case, one must allow a minimum space between the CHMSL and roof to avoid interference.

FIG. 1B illustrates the path of an exemplary light ray 59 through the light guide 58 and hologram 62. The hologram 62 is constructed in this embodiment of a holographic polymer film 62A, one side of which is attached to a Mylar carrier layer 62B. The other side of the hologram 62 is secured to the surface 81 of the light guide 58 by a layer 65 of index-matching optical adhesive.

The CHMSL 50 operates in the following manner. Light which is emitted by the light source 52 is collected and collimated by the concentrator cavity 56 and delivered to the hologram 62 via the light guide 58. The exemplary light ray 59 from the light source 52 and optical concentrator 56 passes through the input aperture of the plastic light guide 58 and is incident on the hologram 62. The light ray 59 propagates down the light guide 58 in one or more bounces, and is partially diffracted by the hologram 62 at each bounce. A portion of the light incident on the hologram 62 is diffracted by the hologram out into the viewing space. Thus, ray 59A is diffracted by the hologram film 62A. The remainder of the light ray passes unimpeded through the hologram film 62A as zero order light ray 59B, through the carrier 62B, totally internally reflects off the Mylar/air interface at point 63A, propagates back through the Mylar carrier 62B, the hologram film 62A, and the light guide 58, totally internally reflects off the light guide/air interface, propagates through the next leg of light guide 58, and is incident on the hologram again. A portion of the light is diffracted; the remainder is not. The process continues.

Figure 2:
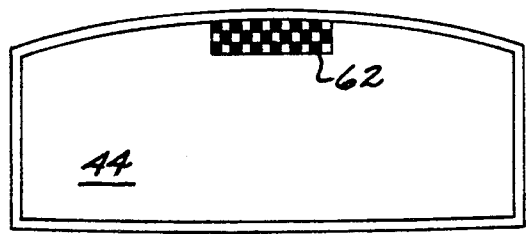
FIG. 2 is a view of the rear window of the vehicle of FIG. 1, illustrating the placement of the hologram of the CHMSL of FIG. 1.

FIG. 2 illustrates the placement of the hologram 62 in relation to the rear window 44.

The light source of the CHMSL of FIG. 1A is a twelve inch long quartz tube having a two millimeter outer diameter and a one millimeter inner diameter, the inner cavity of which has been filled with 99.95% neon and 0.05% argon at 35 torr pressure, sealed off on both ends and folded in the middle to make a 6" long "hairpin" configuration. The light source is driven with an RF signal at 220 MHz which is generated by the compact power supply 54. The RF power is electrically coupled to the light source via three inductive coils that are wrapped around the light source in three places. FIG. 1C illustrates an exemplary tube 52. The tube 52 is 12 inches in length, bent in a "hairpin" so that the tube structure is 6 inches in length. Three inductive coils 53A, 53B and 53C are wrapped around the tube structure at spaced locations. The coils comprise in this example five turns of conductive wire. The coils are spaced two inches apart, with the outer coils spaced one inch from the tube structure ends.

The power source 54 in this embodiment comprises an RF generator circuit for producing RF energy having a frequency of 220 MHz. The source 54 is preferably of compact size so as to fit within the housing 64. Such a generator can be constructed using available technology, such as low-temperature-cofired-ceramic technology. Alternatively, the power source could be located elsewhere in the vehicle, such as in the vehicle trunk, and the RF signal coupled to the lamp bulb via a transmission line such as a coaxial line.

It is not necessary that the light source bulb 52 be excited by RF energy; other forms of electrical energy could also be used as the excitation energy. For example, low frequency AC voltage could be applied to the bulb. In addition, a high DC voltage could be applied to the bulb 52 to activate the neon gas. However, to produce a high voltage from the vehicle battery supply would typically require converting the battery voltage to an AC signal, applying the AC voltage to a transformer to transform the signal into a high voltage, and then rectify the resulting voltage to obtain the signal to be applied to the bulb.

It will be appreciated that, when used as a CHMSL, the excitation of the gas discharge tube will be gated on and off as the vehicle brakes are applied and released. Thus, the power source 54 is gated on and off each time the brakes are applied and released.

To prevent electromagnetic interference in the vehicle caused by RF radiation emanating from the light source, the entire front end of the unit is encapsulated in the metal housing 64. In addition, the wire mesh screen 66 placed between the optical concentrator 56 and light guide 58 is grounded to the housing 64, and allows the majority of visible light to pass through the wire mesh while attenuating the majority of RF radiation. The same effect could have been achieved by replacing the wire mesh screen with an indium-tin-oxide coated glass plate.

Figure 3:
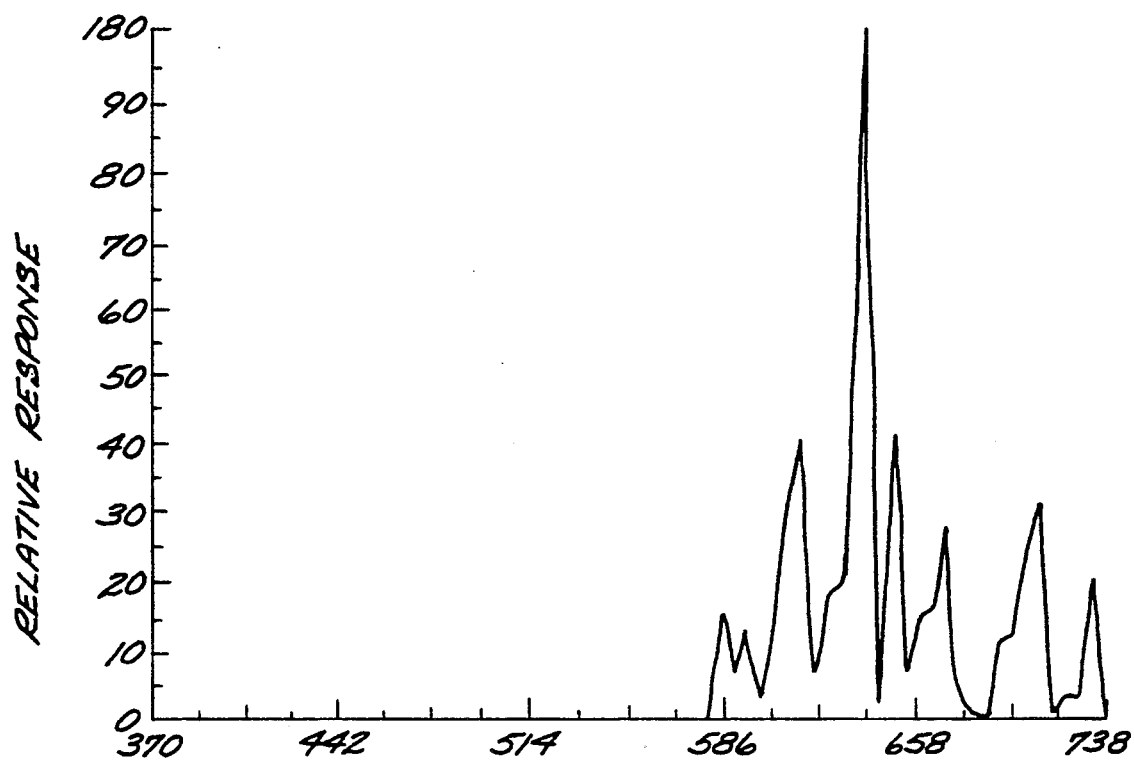
FIG. 3 illustrates the emitted light spectrum of the light source bulb of the embodiments of FIG. 1.

In 1931 the Commission Internationale de l'Eclairage (CIE) established a method for quantitatively describing the color of any object. The method involved taking the output spectrum of the object and using it to calculate three values: x, y, and z. These three values are related by the formula $$x+y+z=1$$

so that if one knows x and y, z is also known. Therefore, one can completely specify a color with x and y only. Once x and y have been calculated, one can look on the CIE 1931 chromaticity diagram, published, for example, in "Color Science, Concepts and Methods, Quantitative Data and Formulas," G. Wyszecki and W.S. Stiles, John Wiley & sons, Second Edition, at FIG. 3, at page 137 to determine how its color compares to known colors. For a CHMSL, the Federal government has mandated that its color be a certain red. To define this quantitatively, a block has been defined within the 1931 CIE chromaticity diagram into which the CHMSL color must fall. The light output spectrum of the light source is mainly determined by transition states in the neon gas, which are fixed. However, changing the gas mix, exciting frequency, and bulb geometry can result in a minor change on output spectrum. The light source 52 generates emitted light whose spectrum is shown in FIG. 3 and whose 1931 CIE color coordinates are 0.6674, 0.3250, 0.0076. This conforms to the legal color requirement for CHMSLS, which is $y \leq 0.33$, $z \leq 0.01$. Therefore, no filtering of the light is required. The result is greater electrical to optical conversion efficiency and no wasted light. If the output spectrum of the bulb included too much non-red light, the effect would be to make its x, y coordinates fall outside of the legally required area on the 1931 CIE chromaticity diagram. One could then place a longpass color filter in front of the lamp which allowed the red light to pass through but which absorbed the orange, yellow, green, and blue light.

Figure 4:
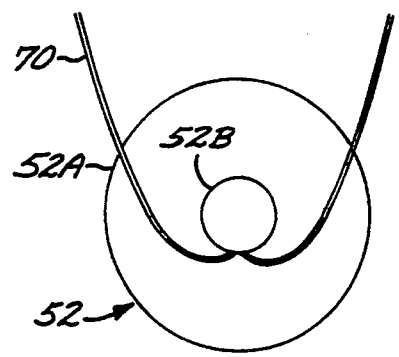
FIG. 4 illustrates the optimum concentrator shape.

The desired function of the optical concentrator 56 is to collect as much light as possible from the light source 52, collimate it vertically into a roughly $\pm 10°$ vertical angular range, and deliver it via the light guide 58 to the hologram 62. Preferably, a concentrator surface contour is selected which is most effective at capturing and collimating the light within a limited available space. For a task of concentrating solar radiation onto a cylindrical pipe, it is known that the optimum concentration of sunlight can be achieved not with an imaging surface such as a parabola but with a non-imaging surface, as specified in "The Optics of Non-Imaging Concentrators," W. T. Welford and R. Winston (Academic, New York, 1978), at pages 119–141. A non-imaging reflector surface does not focus light down to a point or line, but rather to a blurry patch. The principle works in reverse for a light emitting cylinder where the interest is to angularly concentrate the light. If the emitting surface were on the outside of the cylinder and if the reflector could be brought up to the light source surface, then the optimum non-imaging concentration shape would be as shown in FIG. 4 and as described in "The Optics of Non-Imaging Concentrators," id., at pages 94–97 and 189–191. However, the emitting surface of the gas discharge tube 52 is along its inner surface 52B, and the reflector surface 90 can be no closer than 1 mm to the outer surface 52B of the light source, due to the parasitic capacitance that would result if the surface were closer. Under such conditions, the optimum non-imaging concentrator cannot be realized. However, the non-imaging concentrator shown in FIGS. 5A–5C yields very good performance.

Figure 5A:
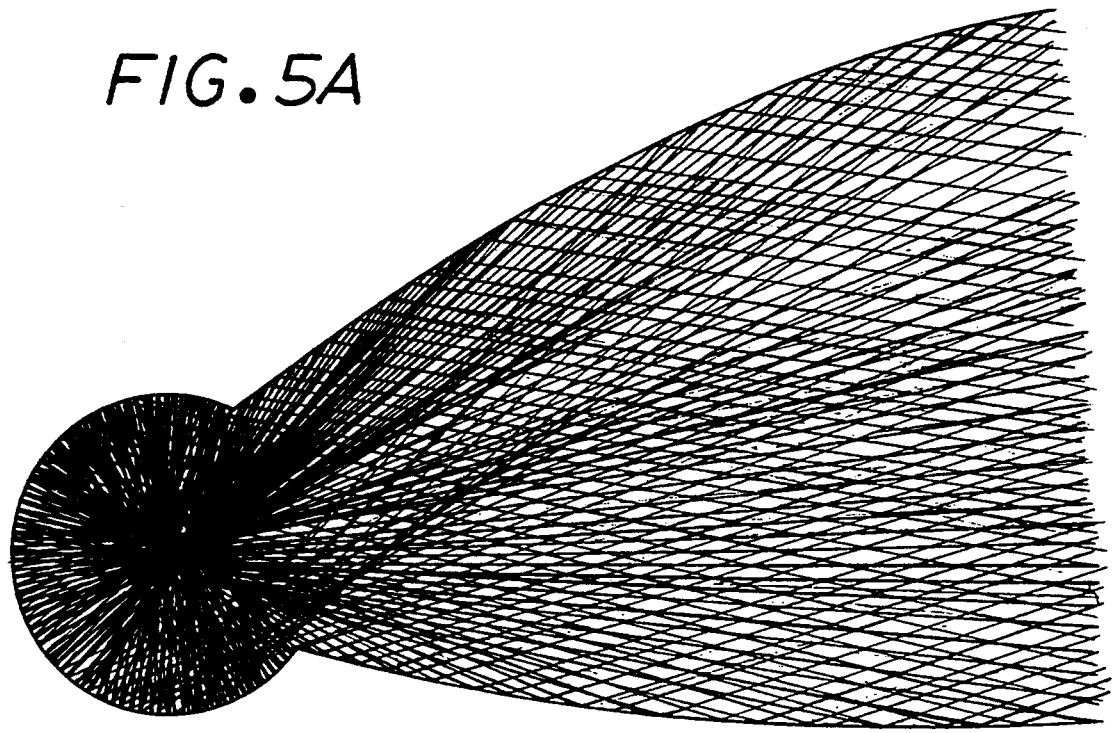

FIG. 5A illustrates a vertical cross-section of the concentrator 104 with light ray paths indicated therein. FIG. 5B is a further view illustrative of the concentrator 104, which comprises a spherical back mirror section 104A, and first and second parabolic side members 104B and 104C. In an exemplary embodiment, the back mirror section has a radius of 3.5 millimeters. Before any tilting of the concentrator as a whole (the concentrator axis is finally inclined at 19 degrees), the vertices and foci of the parabolic side members are located at:

$$V1 = (Z, Y) = (-1.6477, -1.3268) \quad F1 = (0, -1.5)$$

$$V2 = (-1.6477, 1.3268) \quad F2 = (0, 1.5)$$

where the coordinates are in millimeters, and the center of the Y,Z coordinate system is the center of curvature of the spherical back mirror section 104A. The line 104D joining $V_1$ and $F_1$ is tilted at $-6$ degrees with respect to the concentrator (Z) axis. The line 104E joining $V_2$ and $F_2$ is tilted at 6 degrees with respect to the concentrator (Z) axis. In the coordinate system whose Z axis lies along the line joining the vertex and focus of a parabola and has a value of $Z=0$ at the vertex 114 of the parabola, as illustrated in FIG. 5C, the parabola is defined by $$Y_2 = 4PZ$$

where P, the distance from the vertex to the focus, is 1.6568.

FIG. 6 is a map of the rays arriving at the hologram 104 of FIG. 5A. Imagine rays incident through the plastic light guide onto the hologram surface. Call the point where the light guide touches the hologram the vertex. Now imagine removing the hologram and extending the plastic a very, very long distance into space (e.g., 100 feet). At the other end of the plastic is a spherically shaped wall whose center of curvature is at the vertex. Imagine that every ray which hits the wall leaves a dot on the wall. The pattern of dots in FIG. 6 is essentially the pattern of rays hitting this wall, which in turn is essentially a map of number of rays versus angular direction of the rays. The pattern delivered to the hologram is close to ideal because it is similar to the luminous intensity distribution of the CHMSL required by governmental regulations.

The ideal distribution of light for the CHMSL is one where the vertical distribution is narrow (no greater than $10°/-5°$), and the horizontal distribution is spread out to at least $+45°/-45°$. The distribution of rays into the hologram, as shown in FIG. 6, meet this requirement. Therefore, the hologram itself need not angularly spread the light any further. It can merely be a transmission grating which bends the light from the light guide out into the ambient but which does not spread it out any further. Since the light source and concentrator already provide the required angular distribution of light, the hologram merely diffracts or bends the internally trapped light into the ambient; it does not provide any additional angular spreading of the light.

Figure 7A:
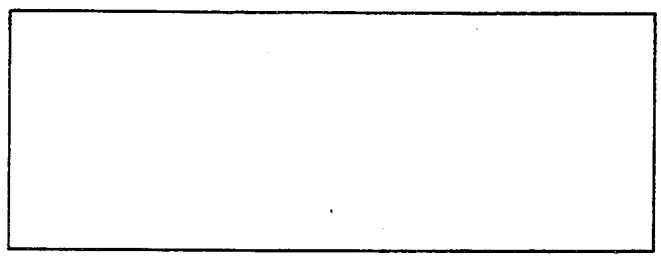
FIGS. 7A–7F illustrate various patterns of holograms to provide various hologram efficiencies.
Figure 7B:
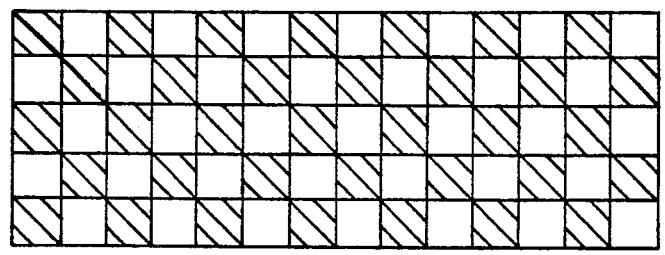
Figure 7C:
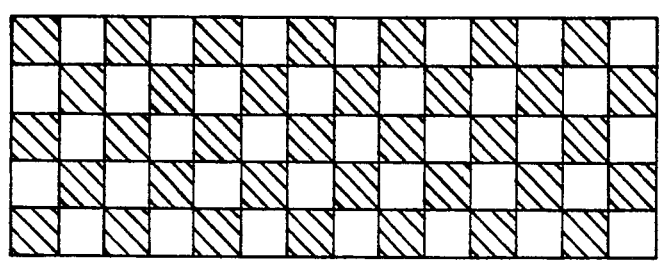
Figure 7D:
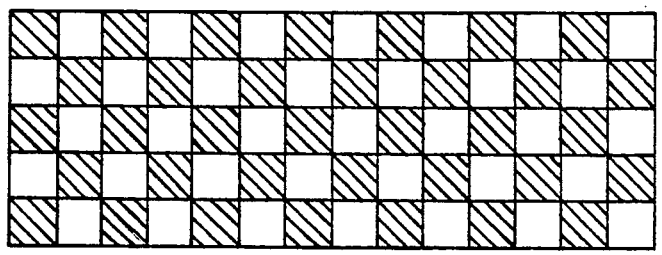
Figure 7E:
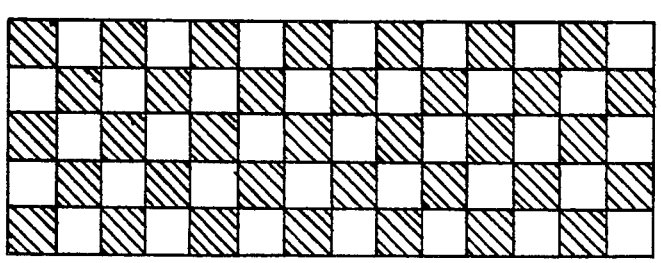
Figure 7F:
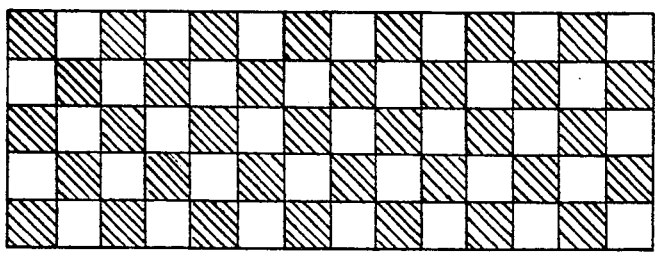

The final leg of the means for guiding the playback illumination to the hologram 62 is the light guide 58 (FIG. 1), which is designed so the internally trapped light propagates down its length. The light guide 58 is fabricated of a clear plastic material and is a solid member. At every bounce of the playback illumination from the surfaces of the light guide 58, some of the light is diffracted by the hologram 62. The light guide 58 can be designed so the light interacts with the hologram 62 one, two, or even more times. Depending on how many interactions the light has with the hologram, the hologram efficiency, i.e., the ratio of the diffracted power to the incident power, is tailored along the vertical extent of the hologram 62 so the resultant image brightness is vertically uniform. One could design the hologram to provide a uniform flat field image as in FIG. 7A. However, by covering the holographic film with a patterned mask and exposing to ultraviolet (UV) light before holographic exposure, the film uncovered by the mask becomes desensitized by the UV, but the covered regions are still photo-sensitive. When the hologram is recorded with two interfering collimated beams, the result is a hologram pattern which is the inverse of the mask.

With a particular photopolymer marketed by E.I. DuPont de Neimours, the efficiency versus exposure level curve makes it difficult to reliably achieve an intermediate level of diffraction efficiency. The reason is that the film requires a threshold exposure level before starting to record the hologram (i.e., achieve maximum diffraction efficiency). Therefore, to vary the diffraction efficiency across the hologram, a useful technique is to UV pre-expose the hologram film with a dot matrix mask over it in which the frequency of the dots is adjusted to adjust the resultant hologram efficiency. Beneath each dot the hologram film is preserved; around each dot the hologram film is desensitized or deadened. The dots themselves are too small to be noticed by an observer; therefore, the result is to control the effective efficiency of the hologram even if the absolute efficiency of any active part of the hologram is maximized. Thus, in the case of the CHMSL, where the playback illumination is incident from the top of the hologram 62, the density or frequency of the dots in the mask is highest adjacent the top of the hologram, and decreases to the lowest density adjacent the lower part of the hologram. In this manner, the efficiency of the resulting hologram will be lowest at the top of the hologram, and gradually increase to its highest level at the bottom side of the hologram.

FIGS. 7B-7E illustrate a checkerboard pattern of square regions of dots wherein the density of dots in the dot regions increases from FIG. 7B to FIG. 7E, from low contrast to medium contrast to maximum contrast. To record a decorative pattern in the hologram but also tailor the efficiency of the hologram, the graded dot matrix pattern is superposed over the decorative pattern in the UV mask. In this manner, any pattern, even those with high resolution, can be recorded in the hologram.

The result is a holographic CHMSL which is more compact, lightweight, unobtrusive, and requires lower power (about 20W) than any previous holographic CHMSL.

FIGS. 8A-8E illustrate a method of fabricating a patterned hologram recorded in a photopolymer film 200. As shown in FIGS. 8A and 8B, a patterned ultraviolet mask 202 is provided which has defined therein the negative of the pattern in which the hologram is to be recorded in the film 200. The mask 202 is opaque to light except in the pattern openings, and is positioned over the film 200. The film 200 is illuminated by ultraviolet light through the pattern openings in the mask 202. The regions of the film which are not covered by the mask 202 are desensitized by the ultraviolet light, but the covered regions of the film are still photo-sensitive. In the next step of the method, a hologram is recorded across the film by illuminating the surface with two collimated laser beams 204 and 204 at a wavelength of 514.5 nm. The interference pattern of the two laser beams is recorded only on the photo-sensitive regions of the film 200. The film 200 is then passed through an ultraviolet curing process 208 and an oven curing process 210. UV curing bleaches the dye in the film to remove photosensitivity. Heating causes the hologram efficiency to increase. The processed film 212 has a hologram recorded therein only in the areas protected by the mask 202.

Figure 9A:
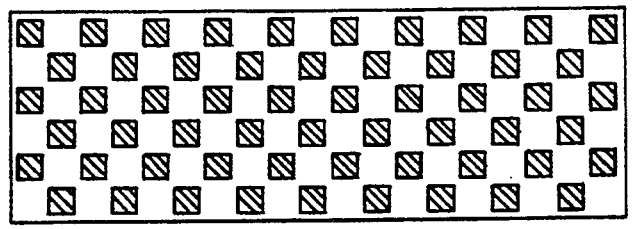
FIGS. 9A–9C illustrate the relationships between the image and the hologram masks.
Figure 9B:
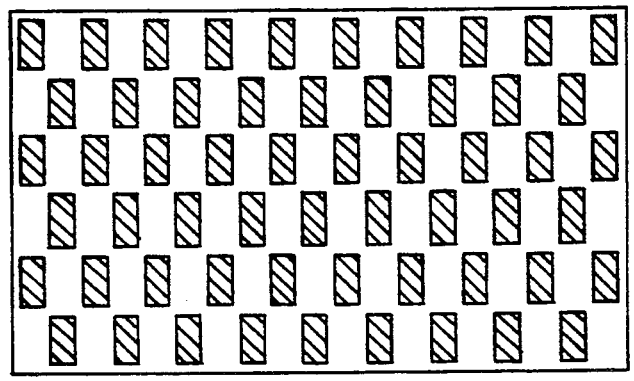
Figure 9C:
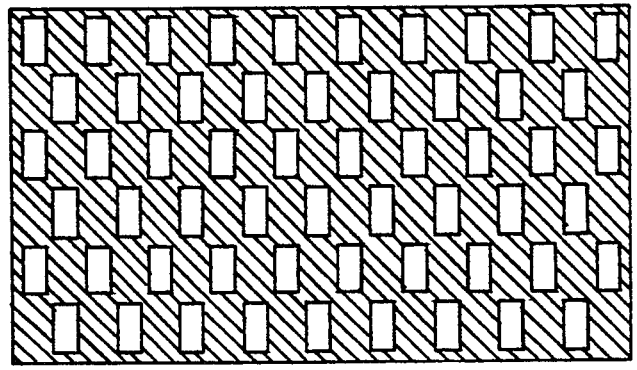

FIGS. 9A-C illustrate the relationship between the hologram images and the mask. FIG. 9A shows an exemplary subtended image size as seen from behind the vehicle. FIG. 9B shows the actual image size looking normal to the hologram. The difference between FIGS. 9A and 9B is due to the angular offset of the hologram when attached to the rear window from the vertical. Finally, FIG. 9C shows a pre-exposure mask, i.e., the mask pattern is the inverse of the hologram image pattern.

FIG. 10 illustrates an alternative embodiment of a CHMSL 215 in accordance with the invention. The CHMSL 215 comprises first and second light guides 216 and 218. Both light guides are formed of solid pieces of a clear plastic such as acrylic. A hole 217 is bored in the first light guide 216, and accepts the gas discharge light bulb (not shown in FIG. 10) comprising the light source. The light bulb is of a single elongated tube configuration, and is excited in a similar manner to the light source of the CHMSL of FIG. 1. The hologram (not shown in FIG. 10) is applied to the largest, upwardly facing surface of the light guide 218. The light guide 216 acts as an imaging concentrator which collimates the light generated by the light source, so that the collimated light reflects from the bottom surface 219A of the first light guide 216 by total internal reflection, toward the input aperture of the second light guide 218. The surface 219B of the light guide 216 is parabolic to provide a parabolic reflecting surface. The key distinctions between the CHMSL 215 and the CHMSL of FIG. 1 are that the light concentrator is not defined by a cavity, but rather by a solid piece of transparent plastic material, and the concentrator is an imaging concentrator. While not as efficient as the non-imaging concentrator of FIG. 1, the imaging concentrator can work well enough for some applications.

FIGS. 11A and 11B illustrates a third embodiment of a CHMSL 220 embodying the present invention. The CHMSL 220 comprises a first light guide 222 formed of a substantially solid piece of acrylic, a second light guide 224 also formed of a solid piece of acrylic, a wire mesh 226 positioned between the two light guides and a plurality 228 of cylindrical fresnel lenslets positioned between the wire mesh and the second light guide. A pair of snap-in tabs 240 secures the assembly of elements 222, 224, 226 and 228 together.

A bore 231 is formed in the guide 222, of appropriate diameter to receive the gas discharge tube 234 therein which comprises the light source. In this embodiment, the lamp tube 234 is segmented, in the sense that the RF excitation is applied via wire loop, capacitive coupling to the lamp segments 236 so that only certain segments of the bulb will emit light. A power supply 232 supplies the RF energy, which may be at 220 MHz as in the CHMSL of FIG. 1, and is connected to the wire rings or loops attached to the periphery of the bulb. FIG. 11B illustrates an exemplary bulb 234A excited via spaced capacitive rings which encircle the bulb structure. Alternating ones of the rings are connected to ground; the other rings are coupled to the RF power source. Thus, for example, rings 234B and 234D are connected to the power source, and rings 234C and 234E are connected to ground. In this example, the rings are spaced 0.5 inches apart. For this example, the bulb will be uniformly lit across the extent; to produce a segmented light source as in FIG. 11A, the rings will extend only across the bulb segments to be lit.

The concentrator of CHMSL 220 is an imaging concentrator, although a non-imaging concentrator could as well be used if the increased efficiency is required for a particular application.

The photopolymer hologram 230 is secured to the largest surface of the second light guide 224, and is disposed adjacent the rear window of the vehicle.

FIG. 12 illustrates a further embodiment of a CHMSL embodying the invention. The CHMSL 250 includes a hologram structure 260 which is secured to the inside surface of the vehicle rear window by a layer 264 of optical index-matching adhesive. A Mylar carrier 262 is secured to the outer surface of the hologram. The playback illumination is generated by a gas-discharge tube 254 disposed inside a cavity 253 defined by a concentrator 252. The optical concentrator cavity defines a non-imaging concentrator as described above with respect to the embodiment of FIG. 1. The gas-discharge tube is excited by a power source, such as an RF source, activated when the vehicle brake pedal is depressed. The light generated by the tube 254 is collimated by the concentrator 252, and directed into the input aperture 255 of a prism 256. The output aperture 257 is adhered to the inner surface of the window 258 by optical adhesive. The hologram structure 260, which can comprise either a reflective hologram or a transmissive hologram, produces stoplight illumination in response to playback illumination generated by the tube 254 and which propagates to the hologram structure 260 via substantially total internal reflections within the rear window 258. The angle of the playback mean as it enters the rear window, the width of the playback beam coupled into the rear window, and the height of the prism are selected as appropriate relative to the thickness of the rear window so that the internally reflected light will not be incident upon the prism/window interface. The selection of such parameters is described more fully in the pending application entitled "Trapped Beam Holographic Center High Mounted Stoplight," by R. T. Smith, A. Daiber, M. McDonald, and A. Au, filed Apr. 16, 1990, as application serial number 07/519,319, the entire contents of which are incorporated herein by this reference.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A holographic stoplight for a vehicle having a rear window, comprising:
    a hologram mounted adjacent said rear window for diffracting playback illumination to produce a holographic stoplight image visible from behind the vehicle;
    a light source for providing playback illumination, said source comprising a gas-filled lamp tube excited by electrical energy, wherein said playback illumination enters said light guiding means through an input aperture, and said light guiding means comprises an optical light guide and means for trapping said playback illumination through total internal reflection at air/light guilde interfaces, except light which is diffracted by said hologram into the ambient, wherein said optical light guide comprises a solid member of transparent material characterized by planar surfaces, and said hologram is affixed adjacent a first one of said surfaces;
    an optical concentrator for collecting and collimating light generated by said light source to within a predetermined angular range;
    light guiding means for guiding the collected and collimated light from said concerntrator to said hologram; and
    wherein the efficiency of said hologram is graded, so that the hologram has a lower efficiency adjacent the Unput aperture than the hologram efficiency at a distance remote from said input aperture and further wherein the light source and the concentrator provide a substantially uniform illumination over the surface area of said hologram;

2. The stoplight of claim 1 wherein said gas-filled lamp tube is excited by RF energy.

3. The stoplight of claim 1 further comprising a power source for generating said RF energy.

4. The stoplight of claim 3 further comprising an inductive coil wrapped about said gas-filled tube and connected to said power source, wherein said lamp tube is excited via RF energy applied to said coil.

5. The stoplight of claim 3 further comprising a pair of spaced conductive rings encircling said gas-filled tube and connected to said power source, wherein said lamp tube is capacitively excited via RF energy applied to said rings.

6. The stoplight of claim 1 wherein said lamp tube is filled with gas comprising neon.

7. The stoplight of claim 1 wherein said lamp tube is characterized by an elongated configuration, said optical concentrator comprises a concentrator cavity defined by a reflecting concentrator surface, and said lamp tube is disposed within said concentrator cavity.

8. The stoplight of claim 1 wherein said optical concentrator is further characterized as a non-imaging concentrator.

9. The stoplight of claim 1 wherein said optical concentrator is further characterized as an imaging concentrator.

10. The stoplight of claim 1 wherein said light guiding means comprises a prism for conducting said playback illumination from said concentrator to a prism/rear window interface so as to trap said light within said window by substantially total internal reflection, and wherein said hologram is mounted on an interior surface of said rear window.

11. The stoplight of claim 11 wherein said concentrator is further characterized as a non-imaging concentrator.

12. The stoplight of claim 10 wherein said concentrator is further characterized as an imaging concentrator.

* * * * *